March 2, 1965   C. T. JOHNSON ETAL   3,172,002
CATHODE MOUNT AND METHOD OF FABRICATION
Filed Nov. 21, 1960   2 Sheets-Sheet 1
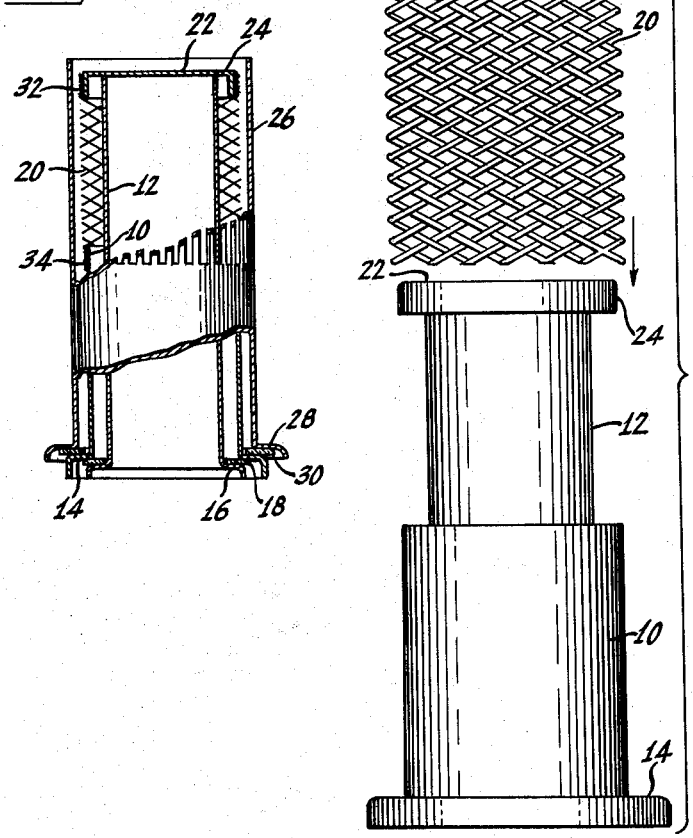
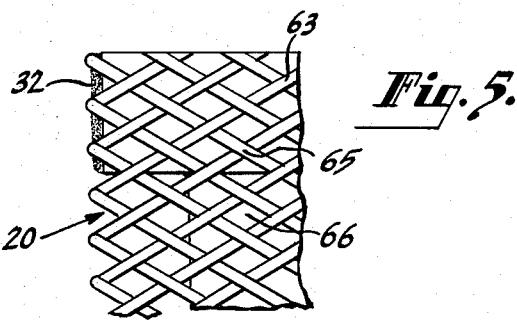
INVENTORS
CARL T. JOHNSON AND
IRA E. SMITH
BY
ATTORNEY March 2, 1965 C. T. JOHNSON ETAL 3,172,002
CATHODE MOUNT AND METHOD OF FABRICATION
Filed Nov. 21, 1960 2 Sheets-Sheet 2
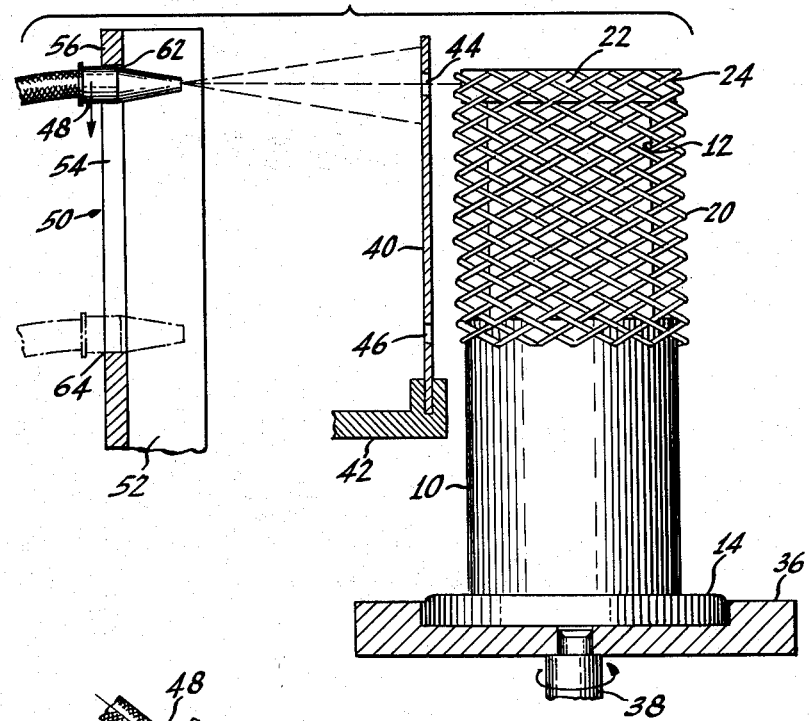
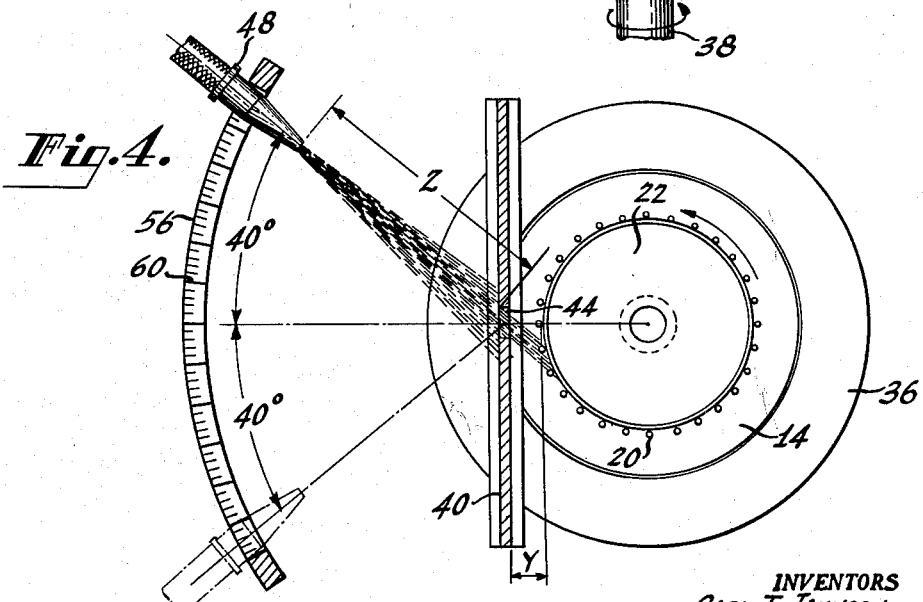
INVENTORS
CARL T. JOHNSON AND
IRA E. SMITH
BY L. A. Larsen
ATTORNEY

United States Patent Office 3,172,002
Patented Mar. 2, 1965

---

3,172,002
CATHODE MOUNT AND METHOD OF FABRICATION
Carl Theodore Johnson and Ira Eugene Smith, Lancaster, Pa., assignors to Radio Corporation of America, a corporation of Delaware
Filed Nov. 21, 1960, Ser. No. 71,870
6 Claims. (Cl. 313—341)

The present invention relates to cathode mounts of the type incorporating a directly heated cathode, and to a method of fabricating such mounts.

Certain types of electron tubes having a relatively high power output include a cathode mount comprising a tubular filamentary structure supported at opposite ends thereof by elongated cylindrical lead members disposed in partly telescoped relation and having one group of adjacent ends fixed in electrically insulated relation. The other ends of the lead members are free and spaced axially a distance slightly less than the length of the filamentary structure referred to, to permit a desired overlap of the filamentary structure with respect to the axially spaced ends of the lead members. To permit the telescoped relation aforementioned, one of the lead members has smaller transverse dimensions than the other. Since such smaller transverse dimensions are less than the corresponding dimensions of the filamentary structure, the free end portion of the one of the lead members referred to, is enlarged radially, to permit a snug fit therebetween and the overlapping portion of the filamentary structure when the latter is threaded over the aforementioned lead member.

It has heretofore been the practice to fix the overlapping end portions of the filamentary structure and the lead members, by welding or brazing. This was not only a tedious and time consuming operation in view of the relatively large number of wires involved, but introduced the hazard of inadvertently failing to weld one or more of the wires. When such failure occurred, the free wire or wires usually sprang out beyond the normal contour of the filamentary structure, and resulted in electrical shorts to an adjacent electrode, such as a grid operated at a different potential than that of the cathode filament. Since power tubes of the type in which the invention is useful are currently designed to operate at ultra high frequencies with consequent close spacing between the electrodes thereof, such spring-outs of the wires of the cathode filament, even though of relatively small magnitude, must be avoided to preserve operativeness of the tubes.

Accordingly, it is an object of the invention to provide an improved cathode mount.

Another object is to provide a cathode mount wherein a tubular filamentary structure is fixed to tubular supports in improved bonds.

A further object is to provide a cathode including a mesh type filamentary structure wherein the filaments of the structure are effectively restrained from spring-out.

Another object is to provide a bond between an end portion of a tubular filamentary cathode and a support, wherein the bonded region lies entirely within the normal contour of the cathode, thereby permitting relatively close spacing between the cathode and an adjacent electrode without danger of electrical shorts therebetween.

A still further object is to provide an improved method of effecting a bond between a tubular filamentary cathode and a support.

According to one feature of the invention, a tubular cathode constituted of a wire mesh, made of tungsten, for example, suitably coated or impregnated for emission, is fixed at each end portion thereof, to a different tubular metal support by a body of metal such as molybdenum, which is entirely disposed within the interstices of the mesh and in engagement with the adjacent support. In this way the bonding material lies almost entirely within the normal outer contour or diameter of the cathode and is free from projections which otherwise would limit the closeness of the spacing between the cathode and an adjacent electrode.

According to a method feature of the invention, the body of bonding metal is formed from a spray of the metal in a molten state. To substantially avoid the build-up of the sprayed metal on the outer surfaces of the wires of the cathode mesh, the spray is directed at an angle within a critical range, so that the force of the spray dislodges the excess, undesired sprayed material from the outer surfaces aforementioned. This angle of spray direction also contributes to uniformity of coating application within the interstices of the mesh, and assures that all wires of the mesh in the region of the bond are effectively bonded by the bonding metal and that the bonding metal contacts the surface of the support engaged by the mesh. The angular application of the spray is also of advantage in that it reduces the force with which the sprayed material impinges on the work pieces.

Further objects and features of the invention will become apparent as the present description continues.

For better understanding of the invention, reference will now be made to the accompanying drawing wherein one way of practicing the invention is illustrated, by way of example, and in which—

FIG. 1 shows an elevation, partly broken away, of a sub-assembly including the novel cathode mount of the invention;

FIG. 2 is an exploded view of a wire mesh cathode, and its support, prior to threading the mesh over the support;

FIG. 3 is a side view of apparatus useful in practicing the method of the invention;

FIG. 4 is a plan view of the apparatus shown in FIG. 3, and illustrates a feature of the method of the invention involving an angular direction of the spray with respect to a radius of the cathode mount; and FIG. 5 is an enlarged fragmentary view of a portion of the wire-mesh cathode engaging one of the supports of the cathode mount of the invention.

A more detailed reference to the drawing will reveal that the sub-assembly shown in FIG. 1, includes a cathode mount comprising an outer tubular support member 10 made of molybdenum for example, and an inner tubular support member 12 coaxial with but having a longer axial extent than number 10. The tubular members may have a thickness of about five mils to reduce heat losses from a cathode to be described. One group of ends of members 10, 12 are adjacent to each other, and have flanges 14, 16, respectively that are sealed to opposite faces of an insulating ring 18, made of a ceramic such as aluminum oxide, for example. The other ends of support members 10, 12 are spaced axially of the members to provide accommodation for a wire mesh type cathode 20. The wires of the mesh may be made of tungsten suitably conditioned for electron emission by a thoria coating thereon or by being impregnated with an emitting material, such as thoria. The wires may be about five mils thick. To render the aforementioned other ends of the support members 10, 12 coextensive radially, to permit a desired engagement between end portions of the cathode 20 and the support members, the inner member 12 is provided with a cap 22 having a downwardly turned flange 24, as viewed in FIG. 1. The outer surface of flange 24 is radially coextensive with the outer surface of support 10. The cathode mesh 20 has an inner diameter for snugly engaging the outer surfaces of flange 24 and member 10. The cathode mesh 20 is fixed to the aforementioned outer surfaces in a manner to be described.

The sub-assembly referred to also includes an apertured tubular grid 26 disposed in coaxial relation with respect to the cathode 20 and its supports 10, 12. One end of the grid is provided with a flange 28 sealed to one side of an insulating ring 30, which may be made of material similar to that of ring 18. The other side of ring 30 is sealed to the upper surface of flange 14 of cathode support 10.

The sub-assembly just described may be employed in electron tubes operable at frequencies of 3,000 megacycles or higher. This requires an extremely close spacing between the cathode 20 and grid 26 in view of the relatively short transit time for electrons that such high frequencies require. Such close spacing may be of the order of five mils.

It is apparent that if any projections extending from the cathode have dimensions sufficient to bridge the close spacing referred to, electrical short circuits (shorts) between the cathode 20 and grid 26 will occur. Such shorts will have adverse effects on the usefulness of an electron tube in which they occur.

According to the invention, each of the two portions of the wire mesh cathode 20 in engagement with the outer surfaces of flange 24 and support 10, is firmly embedded in a body of metal 32, 34 respectively. The metal bodies 32, 34 engage the outer surfaces of flange 34 and support 10 with good, secure bonds, and partly surround all the wires in the engaged cathode mesh to bond ruggedly all of said wires to the outer surfaces aforementioned. The thickness of the metal bodies 32, 34 is not appreciably greater than that of the engaged mesh. Consequently, the bonded regions of the cathode 20 have an outer contour unaffected by the bonding bodies 32, 34. Since all of the wires of the mesh at the bonded region are engaged by the bodies 32, 34, free wire spring-out is avoided. This assures desired uniformity in the outer contour of the cathode 20 and renders the cathode of particular utility in electron tubes operable at ultra high frequencies.

The composition of the metal bodies 32, 34 is dependent upon the intended temperature of operation of the cathode with which they are associated. Furthermore, they should be made of a material that is harmless to the emitting function of the cathode. In the instant example, the metal bodies 32, 34 were made of molybdenum. This selection was in recognition of a cathode operating temperature of 1700° C. and the fact that molybdenum is relatively passive with respect to electron emission.

In the fabrication of a cathode mount according to the invention and as shown in FIG. 2, the tubular support members 10, 12 are fixed to insulating ring 18 and the cap 22 is provided at the free end of the inner member 12. Thereafter, the tubular mesh cathode 20, is threaded or telescoped over the cap 22 until its lower end overlaps the upper end portion of support 10, to approximately the same magnitude that the upper end of the mesh overlaps the flange 24 of the inner support member 12. The axial dimensions of the cathode 20 and the support members 10, 12 are predetermined, so that when the cathode mesh is telescoped over the members 10, 12 as indicated, a desired magnitude of overlap occurs. In the instant example, the amount of this overlap was about .100 inch with respect to both flange 24 and the support member 10.

Flange 24 and the upper end portion of the support member 10 have the same outer diameter. The cathode mesh 20 is provided with an inner diameter substantially equal to the aforementioned outer diameter. In this way, the cathode mesh 20 forms a relatively snug fit with the flange 24 and upper end portion of member 10 when threaded thereover. This snug fit is accompanied by a sufficient force to restrain relative movement of the cathode mesh and its supports in preparation for the fixing operation to be described.

One way in which the fixing operation according to the invention may be accomplished, is illustrated in FIGS. 3 and 4. The cathode mount, comprising the outer tubular support and lead member 10 fixed at flange 14 thereof to the inner tubular support and lead member 12 and with the mesh type cathode 20 snugly engaging the flange 24 of cap 22 fixed to the free end of member 12, and the upper end region of the outer member 10, is positioned on a turntable 36. The turntable is mounted on a shaft 38 connected to means (not shown) for rotating the turntable in either desired direction. A mask 40, fixed to a support 42 in axially parallel relation to the cathode 20, is provided with horizontal slots 44, 46, as viewed in FIG. 3. The mask 40 may be made of a material such as copper. Slot 44 is in register with a radius of flange 24 on the cap 22, normal to the mask 40. Slot 46 is disposed in a similar relation with respect to the upper edge region of member 10. A nozzle 48, connected to a source of molten metal under pressure, such as molybdenum, is adapted to be directed manually and in succession to the slots 44, 46. If desired, a rectangular frame 50, mounted on a support 52, may be used to facilitate orientation of the nozzle 48 in the several predetermined positions thereof to be described. The frame 50 includes two side members, one of which is identified by reference numeral 54 in FIG. 3, and two horizontal members 56, 58. The side members determine horizontal terminal positions of the nozzle, and the horizontal members orient the nozzle in register with either of slots 44, 46, when the nozzle is brought into engagement therewith, as shown in FIG. 3. As shown in FIG. 4, the upper horizontal member 56 may have angular calibrations 60 thereon to guide an operator in holding the nozzle in any desired horizontal angular relation with respect to the mask 40. Furthermore, the horizontal members 56, 58 may have inclined facing surfaces 62, 64, respectively (FIG. 3), so that when said surfaces are engaged by a sloping side of nozzle 48, it disposes the nozzle in axial register with horizontal planes passing through either slot 44, or 46. The side members may have similarly inclined facing surfaces to orient the nozzle in a vertical plane intersecting the aforementioned horizontal planes at the regions of the slots 44, 46.

Applicants have found that for best results, certain desirable relationships should be observed among the positions of the nozzle 48 and mask 40, and the direction and velocity of rotation of the turntable 36, as well as the velocity of the spray from the nozzle. As shown in FIG. 5, the wires 63 of which the cathode 20 is made, are interwoven to form a mesh. The interwoven character of the mesh involves the positioning of one wire over another, as shown at 65, FIG. 5. In one example, the wires were of five mil size, thus rendering the thickness of the mesh at 65, ten mils. It will be noted that rectangular openings or interstices 66 are produced as a result of the mesh construction. Each corner of a rectangular opening is defined by a cross-over region which constitutes a double thickness of the wire 63. The openings 66 therefore, have appreciable depth. This depth introduces a problem of appropriately distributing within each opening the molten metal spray from nozzle 48. Furthermore, the molten metal spray should be controlled in such a way as to avoid damage to the fragile cathode and its support members.

In one example, as shown in FIGS. 3 and 4, the aforementioned desirable relationships are realized and the foregoing problems are solved. In this example, the nozzle 48 is positioned in a horizontal plane including the upper end region of the cathode 20 (FIG. 3) and spaced from the slot 44 in said plane a distance Z (FIG. 4) of from three to four inches. The axis of the nozzle passes through the slot 44 and is disposed at an angle X, of from 30 to 45° with respect to a plane including the axis of cathode 20 and normal to the mask 40. The mask 40 is positioned a distance Y (about one-eighth of an inch) from the cathode 20. The dimensions of each slot are about .250 inch in a horizontal direction and about .100 inch in a vertical direction. These dimensions and positions of the elements referred to, cause metal spray from the nozzle 48 to pass through the slot 44 and to impinge nearly tangentially on the cathode cage and upon the upper end portion of cathode 20 at a region thereof spaced horizontally from the plane referred to as shown in FIG. 4. This portion of the cathode is disposed on a side of the aforementioned plane opposite to the side thereof from which the nozzle 48 is spaced. The turntable 36 is rotated at about 45 revolutions per minute in a direction to cause the aforementioned region to recede from the mask 40. In the example of FIG. 4, this direction is counterclockwise.

This causes the molten metal from the spray gun 48 to enter the interstices formed in the mesh of the cathode 20 and to engage the sides of the wires forming the interstices as well as the bottoms thereof constituting the flange 24. In addition, the force of the spray, which may be impelled by a pressure of 50 pounds per square inch, and the angle in which the spray is directed, cooperate not only to prevent the accumulation of any appreciable amount of sprayed material on the outer sides of the mesh wires forming the normal contour of the cathode 20, but also tempers the force with which the spray strikes the workpieces, thereby preserving the workpieces from deformation.

The spray is deposited with an appreciable uniformity in each of the interstices 66 (FIG. 5) of the cathode 20. That is to say, in each interstice, the metal body formed by the spray engages the sides of the wires defining the interstice and the bottom of the interstice defined in FIGS. 3 and 4 by the flange 24. This uniformity results from a combination of factors. Thus, the far side of each interstice within the area of spray as shown in FIG. 4, receives a copious amount of sprayed metal, since it is in line with the direction of the spray. The same is true of the sides normal to the aforementioned far side. With respect to the remaining near side of the interstice, it will be noted from FIG. 4 that this side cuts across the spray at an angle. Such action causes the near side to accumulate spray material. The amount of material so accumulated has been found to be substantially equal to the amount of material deposited on the far side, under the conditions specified in the foregoing. The bottom of the interstice defined in this case by the flange 24 is also uniformly covered with sprayed material as a result of the conditions just described.

To further contribute to uniformity in the coating body formed in each of the interstices in the cathode mesh, the nozzle 48 may be moved to the position shown in phantom in FIG. 4, in which position its axis describes the same angle as before with respect to a radius of cathode 20 normal to the mask 40, but on the opposite side of the radius referred to. With this change in position of the nozzle, the turntable should be rotated in a direction opposite to that aforementioned and at the same velocity as before.

It should be noted in this connection, that the magnitude of angular displacement of the axis of nozzle 48 from a plane including the axis of cathode 20 and normal to the mask 40 affects the uniformity with which the sprayed material is deposited in each of the interstices of the cathode mesh, as well as the force of the spray absorbed by the workpieces. For example, an increase in the angle formed by the nozzle axis and the plane referred to, while it will reduce the force of the spray on the workpiece, will also reduce the amount of spray deposited on the near side and increase the deposit on the far side. When such angle is from 30 to 45°, the near and far sides of each interstice in the area of the spray, receive substantially equal amounts of material, and the impinging force of the spray is kept at a magnitude which is harmless to the shape of the delicate workpieces.

After a sufficient amount of spray material has been deposited on the upper end region of the cathode 20 and the flange 24, the nozzle may be moved manually downward along the side 54 of the frame 50 until it laterally abuts against the inclined surface 64 of the horizontal member 58 of the frame 50. In this position, the nozzle is properly oriented with respect to the lower end portion of the cathode 20 that overlaps the upper end portion of mount member 10. This lower end portion of the cathode is then sprayed with molten metal in a manner similar to that in which the upper end portion thereof was sprayed, as described in the foregoing.

What is claimed is:

1. A cathode mount comprising a relatively thin cylindrical support member, a wire mesh cathode having an end portion engaging an end portion of said support member in overlapping relation and a body of metal appreciably uniformly deposited within each interstice defined by the portions of the mesh of said cathode engaging said end portion of said support member, said body being made of a metal different from the metal of said cathode and in adhesive engagement with wires of said mesh and with said support member, the wire mesh engaged by said body having surface portions defining the normal outer contour of said cathode, said surface portions being substantially free from said metal body.

2. In cathode mount comprising two metal tubular members disposed in coaxial and partly concentric relation, said members having one group of axially coextensive end portions, means insulatingly fixing said end portions with respect to each other, said members having another group of axially spaced end portions, the axially spaced end portion of the inner of said members being radially enlarged so as to have an outer diameter equal to the outer diameter of the axially spaced end portion of the outer of said members, the improvement comprising the combination of a tubular wire mesh cathode having a base made of tungsten having an inner diameter substantially equal to said outer diameter and telescoped into engagement with said axially spaced end portions, and bodies of molybdenum metal substantially entirely within each of the interstices defined by the portions of said mesh in engagement with said axially spaced end portions, said wire mesh having outer surface regions defining the normal outer contour of said cathode, said outer regions of said mesh portions being spaced from said metal bodies said bodies of metal being in adhesive engagement with said spaced end portions and with the sides of said wires of said mesh defining said interstices.

3. A cathode mount comprising:
   (a) a cylindrical metal support having a thickness no greater than about 10 mils,
   (b) a cylindrical cathode in the form of a tungsten wire mesh wherein the wires have a diameter of about 5 mils,
   (c) an end portion of said cylindrical cathode being snugly telescoped over an end portion of said cylindrical support, the wires in said end portion of the cathode defining side walls of interstices, said support defining bottoms of said interstices, said wires in said end portion having outer surfaces remote from said bottoms and defining the normal outer contour of said cathode, and
   (d) a body of molybdenum in each of said interstices and in adherent engagement with said side walls and the entire surfaces of said bottoms, said body being disposed only within said normal outer contour of the cathode, said outer surfaces of said wires being free of said body of molybdenum,
   (e) whereby a said cathode is adapted to have disposed in closed spaced relation about said cathode with freedom from contact therewith a cylindrical electrode.

4. A cathode mount comprising:
(a) a cylindrical metal support,
(b) a cylindrical wire mesh cathode snugly engaging an end portion of said support and,
(c) means fixing said wire mesh cathode to said end portion of the support while preserving the wires of said wire mesh and said end portion from deformation,
  (1) said fixing means comprising bodies of metal lying entirely in interstices formed by the wire mesh and said end portion of the support and adherently engaging said end portion and sides only, of said interstices,
  (2) whereby surface portions of the wires of said wire mesh are exposed and define the normal outer contour of said cathode.

5. A cathode mount comprising:
(a) a cylindrical metal support having a thickness less than about 10 mils.
(b) said support having an end portion comprising an imperforate metal disc extending normal to the support and having a cylindrical flange coaxial with the support,
(c) a wire mesh cathode having an initial outer contour and telescoped over and snugly engaging said flange, said wire mesh having surface portions radially remote from said flange, and
(d) means for fixing a region of said wire mesh cathode to said flange, said means comprising:
  (1) a body of metal different from the metal of said wire mesh cathode adherently engaging said flange and said wire mesh at portions only of said wire mesh spaced from said surface portions thereof, said surface portions solely defining said initial outer contour of said wire mesh cathode in said region.

6. An electrode mount comprising:
(a) a cylindrical wire mesh cathode, the wires of said mesh having a thickness of about 5 mils,
(b) a cyclindrical grid concentric about said cathode, the radical spacing between said grid and cathode being of the order of 5 mils,
(c) a cylindrical support engaging the inner surface of said mesh cathode, and
(d) means fixing said mesh cathode to said support, said means comprising a body of metal adherently engaging said support and portions only of said wire mesh cathode spaced from the outer surface thereof,
(e) said outer surface solely defining the normal outer contour of said mesh cathode,
(f) whereby said cathode is free from projections contacting said cylindrical grid.

References Cited by the Examiner
UNITED STATES PATENTS

| | | | |
|---|---|---|---|
| 2,399,005 | 4/46 | Crawford | 29—25 |
| 2,445,814 | 7/48 | Wing et al. | 313—348 X |
| 2,647,298 | 8/53 | Pryslak et al. | 29—25 |
| 2,653,268 | 9/53 | Kumpfer | 313—346 |
| 2,928,978 | 3/60 | Morton | 313—341 X |
| 2,951,172 | 8/60 | Griffiths et al. | 313—341 X |
| 3,007,075 | 10/61 | Schwender | 313—346 |

DAVID J. GALVIN, *Primary Examiner.*

ARTHUR GAUSS, GEORGE N. WESTBY, *Examiners.*

UNITED STATES PATENT OFFICE
CERTIFICATE OF CORRECTION

Patent No. 3,172,002                          March 2, 1965

Carl Theodore Johnson et al.

It is hereby certified that error appears in the above numbered patent requiring correction and that the said Letters Patent should read as corrected below.

Column 8, line 9, for "radical" read -- radial --.

Signed and sealed this 27th day of July 1965.

(SEAL)
Attest:

ERNEST W. SWIDER                        EDWARD J. BRENNER
Attesting Officer                          Commissioner of Patents